(12) United States Patent
Komori et al.

(10) Patent No.: US 11,773,296 B2
(45) Date of Patent: Oct. 3, 2023

(54) METHOD FOR CURING ADHESIVE COMPOSITION AND METHOD FOR MANUFACTURING BONDED STRUCTURE

(71) Applicant: OMRON Corporation, Kyoto (JP)

(72) Inventors: Takekazu Komori, Kusatsu (JP); Daisuke Sato, Moriyama (JP); Kyoji Kitamura, Uji (JP); Yosuke Tatsuno, Kusatsu (JP); Yuki Hoga, Tokyo (JP)

(73) Assignee: OMRON Corporation, Kyoto (JP)

( * ) Notice: Subject to any disclaimer, the term of this patent is extended or adjusted under 35 U.S.C. 154(b) by 1015 days.

(21) Appl. No.: 16/607,373

(22) PCT Filed: Feb. 16, 2018

(86) PCT No.: PCT/JP2018/005480
§ 371 (c)(1),
(2) Date: Oct. 23, 2019

(87) PCT Pub. No.: WO2018/230041
PCT Pub. Date: Dec. 20, 2018

(65) Prior Publication Data
US 2020/0140720 A1    May 7, 2020

(30) Foreign Application Priority Data
Jun. 16, 2017   (JP) .................... 2017-118789

(51) Int. Cl.
*C09J 5/06* (2006.01)
(52) U.S. Cl.
CPC ........... *C09J 5/06* (2013.01); *C09J 2301/416* (2020.08); *C09J 2463/00* (2013.01)
(58) Field of Classification Search
CPC .... C09J 5/06; C09J 2301/416; C09J 2463/00; C09J 2301/408; C09J 2301/41; C09J 7/20;
(Continued)

(56) References Cited

U.S. PATENT DOCUMENTS

| 2003/0201059 A1 | 10/2003 | Holman et al. |
| 2006/0105493 A1 | 5/2006 | Hunze et al. |

(Continued)

FOREIGN PATENT DOCUMENTS

| CN | 101489789 A | 7/2009 |
| CN | 101679729 A | 3/2010 |

(Continued)

OTHER PUBLICATIONS

Extended European search report (EESR) dated Jan. 28, 2021 in a counterpart European patent application.

(Continued)

*Primary Examiner* — Daniel H Lee
(74) *Attorney, Agent, or Firm* — METROLEX IP LAW GROUP, PLLC

(57) ABSTRACT

A method for curing an adhesive composition includes: arranging an adhesive composition that transmits laser light of a first wavelength in contact with a surface of a first adherend that contains, at least at its surface, a first light-to-heat conversion material that generates heat by absorbing laser light of the first wavelength; and curing the adhesive composition by irradiating the adhesive composition and the first adherend with laser light of the first wavelength. In a method for manufacturing a bonded structure, a first bonded structure is manufactured by bonding the adhesive composition to the first adherend by using the method for curing an adhesive composition.

7 Claims, 11 Drawing Sheets

(58) Field of Classification Search
CPC ....... C09J 7/30; C09J 201/00; B29C 65/1616; B29C 65/1635; B29C 65/1677; B29C 65/4835; B29C 66/112; B29C 66/1122; B29C 66/114; B29C 66/43; B29C 66/43421; B29C 66/43441; B29C 66/71; B29C 66/74281; B29C 66/91645; B29C 66/919; B29C 66/949; B32B 7/12; B32B 15/08

See application file for complete search history.

(56) References Cited

U.S. PATENT DOCUMENTS

| | | |
|---|---|---|
| 2008/0014532 A1 | 1/2008 | Kessel et al. |
| 2014/0264951 A1 | 9/2014 | Faruqui et al. |
| 2016/0049622 A1 | 2/2016 | Hashimoto et al. |
| 2017/0066230 A1 | 3/2017 | Nakajima et al. |

FOREIGN PATENT DOCUMENTS

| | | | |
|---|---|---|---|
| CN | 101788713 A | 7/2010 | |
| CN | 102161233 A | 8/2011 | |
| CN | 102892819 A | 1/2013 | |
| CN | 105122496 A | 12/2015 | |
| CN | 105968566 A | 9/2016 | |
| CN | 106062027 A | 10/2016 | |
| EP | 2119552 A1 | 11/2009 | |
| EP | 3118237 A1 | 1/2017 | |
| JP | S63-063773 A | 3/1988 | |
| JP | 2002-166653 A | 6/2002 | |
| JP | 2008-308525 A | 12/2008 | |
| JP | 2011-235604 A | 11/2011 | |
| JP | 2013-180526 A | 9/2013 | |
| JP | 2015-125185 A | 7/2015 | |
| JP | 2015-174911 A | 10/2015 | |
| WO | 2012/104006 A1 | 8/2012 | |
| WO | 2014/156905 A1 | 10/2014 | |
| WO | WO-2014156905 A1 * | 10/2014 | ............. B32B 15/08 |
| WO | WO-2015097966 A1 * | 7/2015 | ......... B29C 65/1616 |

OTHER PUBLICATIONS

Jansen et al., "Laser acoustic, thermal and mechanical methods for investigations of bond lines", International Journal of Adhesion and Adhesives, May 31, 2009, pp. 210-216, 29.

Wang Hongmei, "Application of laser in secondary processing of plastics", Modern plastics processing and Applications, Aug. 20, 2004, pp. 28-30, 16(4).

Wang Jun et al., "A new technology for rapid curing of glue-laser curing", Laser Technology & Applications, Jan. 25, 2006, pp. 35-38.

Chinese Office Action (CNOA) dated Mar. 17, 2021 in a counterpart application filed in China.

Taiwanese Office Action (TWOA) dated Mar. 27, 2019 in a counterpart application filed in Taiwan.

English Translation of the International Search Report("ISR") of PCT/JP2018/005480 dated Apr. 24, 2018.

Written Opinion("WO") of PCT/JP2018/005480 dated Apr. 24, 2018.

* cited by examiner

METHOD FOR CURING ADHESIVE COMPOSITION AND METHOD FOR MANUFACTURING BONDED STRUCTURE

TECHNICAL FIELD

The present invention relates to a method for curing an adhesive composition and a method for manufacturing a bonded structure. More specifically, the present invention relates to a method for curing an adhesive composition in which an adhesive composition is cured by generating heat through laser light irradiation and a method for manufacturing a bonded structure in which the method for curing an adhesive composition is used.

RELATED ART

As a method for bonding electronic components and the like in a short time, JP 2015-174911A (Patent Document 1) discloses a method for curing a resin composition that includes directly and/or indirectly irradiating, with laser light, a resin composition that contains an epoxy resin, a filler, a color material, and a capsule curing agent that contains cores in which a curing agent is contained and shells that cover the cores.

RELATED ART DOCUMENTS

Patent Documents

Patent Document 1: JP 2015-174911A

SUMMARY OF THE INVENTION

Problem to be Solved by the Invention

However, in the method for curing a resin composition disclosed in JP 2015-174911A (Patent Document 1), the color material, which is a light-to-heat conversion material that generates heat by absorbing laser light, is contained in the resin composition, which is an adhesive composition, and accordingly, absorption of laser light and heat generation occur mainly at the surface of the resin composition and in the vicinity of the surface as a result of the laser light irradiation, and curing of the resin composition proceeds from the surface side toward the inner side of the resin composition, and therefore there is a risk that curing of the resin composition on an adherend side will be insufficient and adhesion between the resin composition and the adherend will be insufficient.

Therefore, an object of the present invention is to solve the above-described problem and provide a method for curing an adhesive composition and a method for manufacturing a bonded structure that realize a high degree of adhesion between an adhesive composition and an adherend.

Means for Solving the Problems

[1] A method for curing an adhesive composition according to an aspect of the present invention includes: arranging an adhesive composition that transmits laser light of a first wavelength in contact with a surface of a first adherend that contains, at least at its surface, a first light-to-heat conversion material that generates heat by absorbing laser light of the first wavelength; and curing the adhesive composition by irradiating the adhesive composition and the first adherend with laser light of the first wavelength. This method increases the degree of adhesion between the adhesive composition and the first adherend.

[2] In the method for curing an adhesive composition according to this aspect, the first adherend may include a metal portion, and in the curing of the adhesive composition, the metal portion may be heated. In this case, bonding between the adhesive composition and the first adherend is promoted, and the degree of adhesion is further increased.

[3] In the method for curing an adhesive composition according to this aspect, the adhesive composition may contain a second light-to-heat conversion material that changes, when heated, to a material that generates heat by absorbing laser light of the first wavelength. In this case, the degree of adhesion between the adhesive composition and the first adherend is further increased.

[4] In the method for curing an adhesive composition according to this aspect, the adhesive composition may contain a third light-to-heat conversion material that generates heat by absorbing laser light of a second wavelength that is different from the first wavelength, and in the curing of the adhesive composition, the adhesive composition and the first adherend may be irradiated with laser light of the first wavelength and laser light of the second wavelength. In this case, the degree of adhesion between the adhesive composition and the first adherend is further increased.

[5] In the method for curing an adhesive composition according to this aspect, in the arranging of the adhesive composition, the adhesive composition may be arranged in contact with both the surface of the first adherend and a surface of a second adherend that contains the first light-to-heat conversion material at least at its surface, and in the curing of the adhesive composition, the adhesive composition may be cured by irradiating the adhesive composition, the first adherend, and the second adherend with laser light of the first wavelength. In this case, the first adherend and the second adherend are bonded to each other via the adhesive composition.

[6] In the method for curing an adhesive composition according to this aspect, in the arranging of the adhesive composition, the adhesive composition may be arranged in contact with both the surface of the first adherend and a surface of a third adherend that transmits laser light of the first wavelength, and in the curing of the adhesive composition, the adhesive composition may be cured by irradiating the third adherend, the adhesive composition, and the first adherend with laser light of the first wavelength. In this case, the first adherend and the third adherend are bonded to each other via the adhesive composition.

[7] In a method for manufacturing a bonded structure according to another aspect of the present invention, a first bonded structure is manufactured by bonding the adhesive composition to the first adherend by using any of the methods for curing an adhesive composition described above in [1] to [4], for example. According to this method, the first bonded structure in which a high degree of adhesion is realized between the first adherend and the adhesive composition can be obtained.

[8] In a method for manufacturing a bonded structure according to another aspect of the present invention, a second bonded structure is manufactured by bonding the first adherend and the second adherend to each other via the adhesive composition by using the method for curing an adhesive composition described above in [5], for example. According to this method, the second bonded structure in which a high degree of adhesion is realized between the first adherend and the second adherend can be obtained.

[9] In a method for manufacturing a bonded structure according to another aspect of the present invention, a third bonded structure is manufactured by bonding the first adherend and the third adherend to each other via the adhesive composition by using the method for curing an adhesive composition described above in [6], for example. According to this method, the third bonded structure in which a high degree of adhesion is realized at least between the adhesive composition and the first adherend out of the first and third adherends can be obtained.

Effects of the Invention

As described above, according to the above-described aspects of the present invention, it is possible to provide a method for curing an adhesive composition and a method for manufacturing a bonded structure that realize a high degree of adhesion between an adhesive composition and an adherend.

EMBODIMENTS OF THE INVENTION

Embodiment 1: Method for Curing Adhesive Composition

First Example

Figure 1:
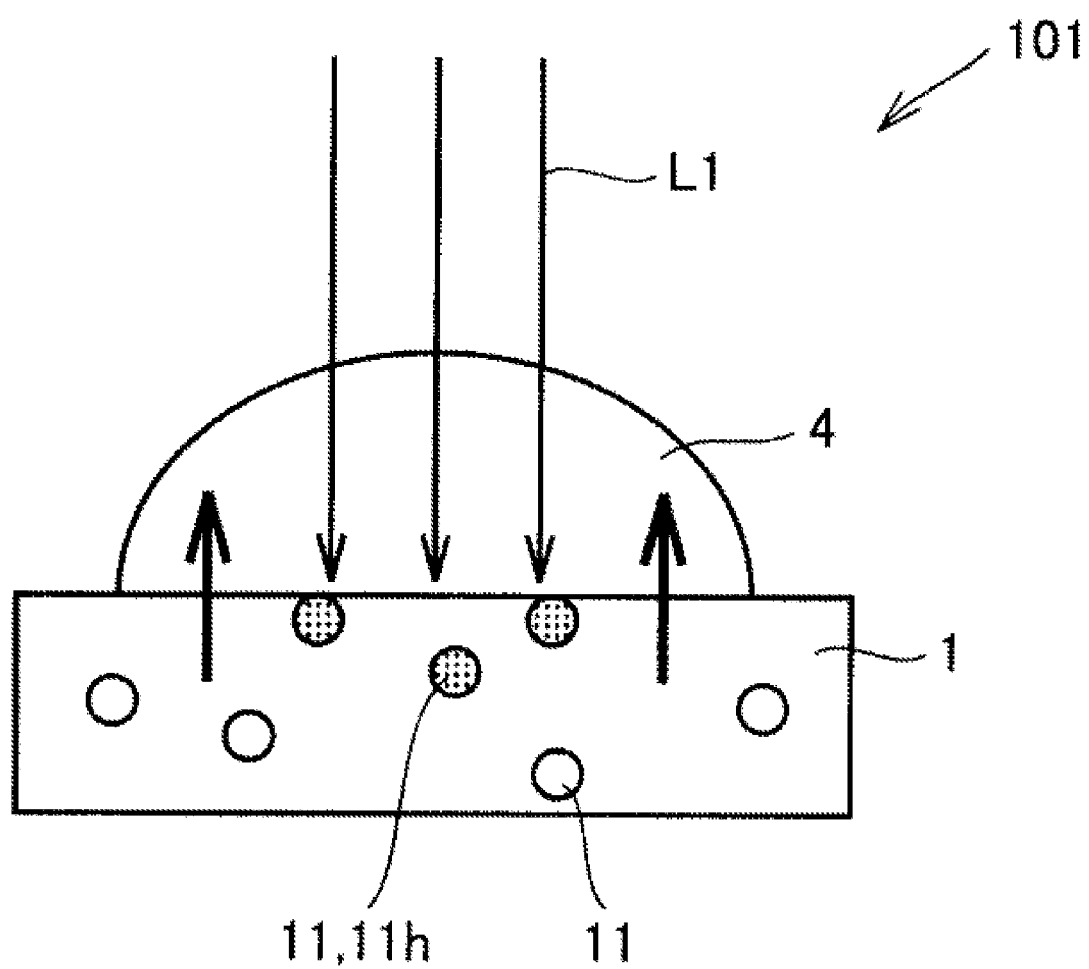
FIG. 1 is a schematic cross-sectional view showing an example of a method for curing an adhesive composition according to an aspect of the present invention.

As shown in FIG. 1, a first example of a method for curing an adhesive composition according to the present embodiment includes: arranging an adhesive composition 4 that transmits laser light L1 of a first wavelength in contact with a surface of a first adherend 1 that contains, at least at its surface, a first light-to-heat conversion material 11 that generates heat by absorbing laser light L1 of the first wavelength; and curing the adhesive composition 4 by irradiating the adhesive composition 4 and the first adherend 1 with laser light L1 of the first wavelength. According to the first example of the method for curing an adhesive composition, laser light L1 of the first wavelength that has passed through the adhesive composition 4 is absorbed by the first light-to-heat conversion material 11 that is contained at the surface of the first adherend 1 and in the vicinity of the surface, and heat is generated (a first light-to-heat conversion material 11$h$ in FIG. 1 shows the first light-to-heat conversion material 11 generating heat), and therefore the adhesive composition 4 is cured from its portion that forms an interface with the first adherend 1. As a result, the degree of curing of the adhesive composition 4 is increased at its portion forming the interface with the first adherend 1, and accordingly the degree of adhesion between the adhesive composition 4 and the first adherend 1 is stably increased.

Furthermore, according to the first example of the method for curing an adhesive composition, it is not necessary to heat the entire product because it is possible to heat and cure only a portion that is to be bonded using the adhesive composition 4, and accordingly it is not necessary to provide a secondary sealing hole for discharging air that has expanded inside the product due to heat.

Figure 2:
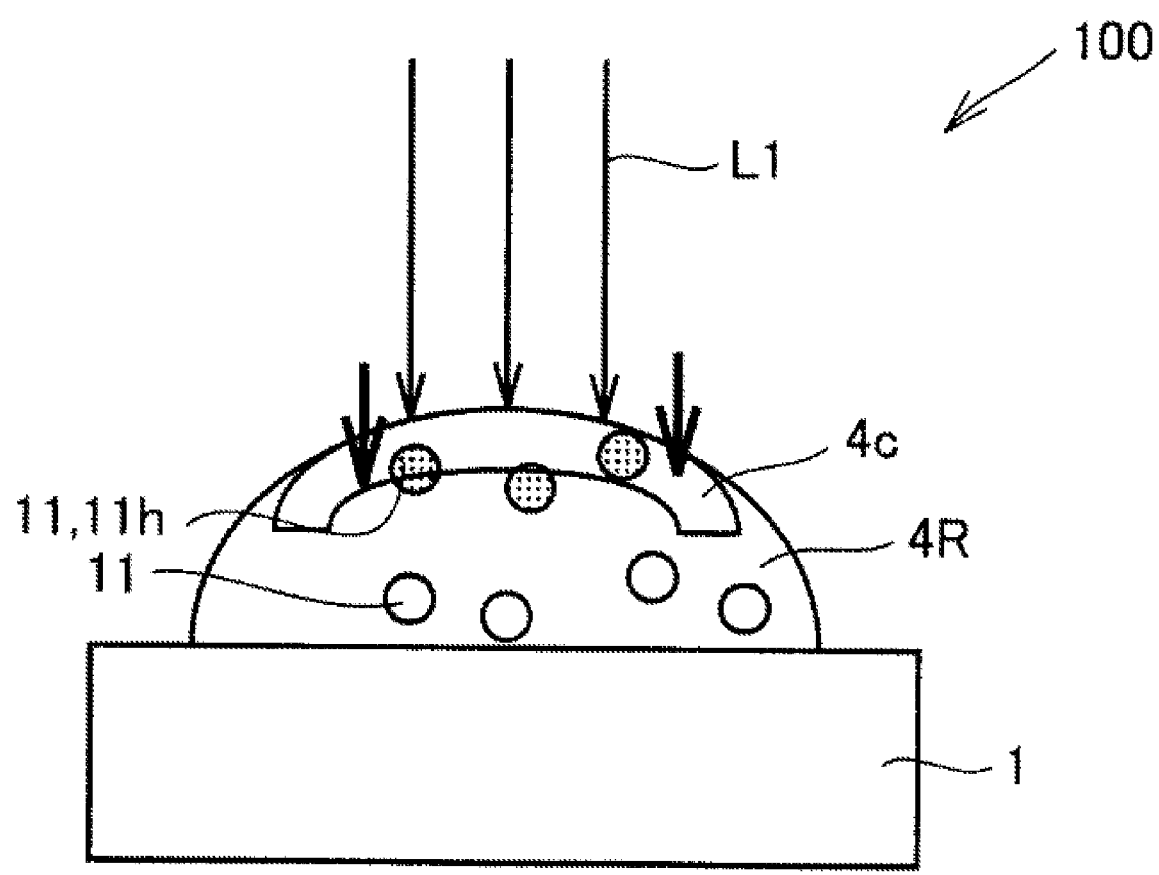
FIG. 2 is a schematic cross-sectional view showing an example of a conventional method for curing an adhesive composition.

As shown in FIG. 2, in a conventional method for curing an adhesive composition such as that disclosed in JP 2015-174911A (Patent Document 1), the first light-to-heat conversion material 11 that generates heat by absorbing laser light L1 of the first wavelength is contained in an adhesive composition 4R, and therefore laser light L1 of the first wavelength that is emitted toward the adhesive composition 4R is absorbed by the first light-to-heat conversion material 11 that is contained in an exposed surface of the adhesive composition 4R and in the vicinity of the exposed surface, and heat is generated (the first light-to-heat conversion material 11$h$ in FIG. 2 shows the first light-to-heat conversion material 11 generating heat), and therefore the adhesive composition 4R is cured from its exposed surface side. As a result, a cured film 4$c$ is formed on the exposed surface side of the adhesive composition 4R, and the degree of curing of the adhesive composition 4R is reduced in its portion that forms an interface with the first adherend 1, and accordingly the degree of adhesion between the adhesive composition 4R and the first adherend 1 is reduced.

In contrast to the above-described conventional method for curing an adhesive composition, the first example of the method for curing an adhesive composition uses the adhesive composition 4 that transmits laser light L1 of the first wavelength and the first adherend 1 that contains, at least at its surface, the first light-to-heat conversion material 11 that generates heat by absorbing laser light L1 of the first wavelength, and therefore the adhesive composition 4 is cured from its portion that forms the interface with the first adherend 1, whereby the degree of curing of the adhesive composition 4 is increased in its portion forming the interface with the first adherend 1, and the degree of adhesion between the adhesive composition 4 and the first adherend 1 can be increased.

First Light-to-Heat Conversion Material

The first light-to-heat conversion material 11 is not specifically limited, as long as the first light-to-heat conversion material 11 generates heat by absorbing laser light L1 of the first wavelength. At least one color material selected from the group consisting of inorganic pigments, organic pigments, and dyes is preferably used. Preferable inorganic pigments are inorganic pigments of black, red, blue, green, and yellow colors, such as carbon black, red lead, ultramarine blue, cobalt green, and chrome yellow, for example. Preferable organic pigments are organic pigments of black, red, blue, green, and yellow colors, such as aniline black, lake red C, phthalocyanine blue, phthalocyanine green, and fast yellow, for example. Preferable examples of dyes include direct dyes, acid dyes, basic dyes, disperse dyes, and reactive dyes. Alternatively, the first light-to-heat conversion material 11 may be a metal body or metal powder made of iron, copper, gold, or the like. Here, the first wavelength means a specific wavelength and preferably, is a light wavelength at which light absorption by the light-to-heat conversion material is maximum.

First Adherend

The first adherend 1 is not specifically limited, as long as the first adherend 1 contains the above-described first light-to-heat conversion material 11 at least in its surface, and the first adherend 1 may further contain a resin such as PBT (polybutylene terephthalate) or PET (polyethylene terephthalate).

Adhesive Composition

Although the adhesive composition 4 is not specifically limited as long as the adhesive composition 4 transmits laser light L1 of the first wavelength, the transmittance of the adhesive composition 4 with a thickness of 0.5 mm is preferably at least 30%, more preferably at least 50%, and further preferably at least 80%, from the standpoint of suppressing absorption of laser light L1 of the first wavelength by the adhesive composition 4 and increasing the amount of laser light L1 of the first wavelength that is transmitted to the surface of the first adherend 1. Here, the transmittance is determined by measuring an amount of light that enters an optical receiver of a power meter when the adhesive composition with a thickness of 0.5 mm that is sandwiched between glass plates is irradiated with laser light, and is expressed as a percentage, taking the amount of light that enters the optical receiver of the power meter in the absence of the glass plates and the adhesive composition as 100%. The adhesive composition 4 contains a resin and a curing agent and is cured by heat that is generated as a result of the first light-to-heat conversion material 11 contained at least at the surface of the first adherend 1 absorbing laser light L1 of the first wavelength.

The resin contained in the adhesive composition 4 is not specifically limited, as long as the resin is cured by reacting with the curing agent due to the above-described heat. An epoxy resin is preferably used, for example. Although the curing agent contained in the adhesive composition 4 is not specifically limited as long as the curing agent causes curing by reacting with the resin due to the above-described heat, at least one compound selected from the group consisting of amine-based compounds, imidazole-based compounds, and thiol-based compounds is preferably contained, from the standpoint of curing the epoxy resin at a low temperature in a short time. Further, a capsule curing agent that contains cores in which the above-described curing agent is contained and shells that cover the cores is preferably used, from the standpoint of controlling a curing reaction of the adhesive composition 4 that is caused by the above-described heat.

Second to Fourth Examples

Figure 3:
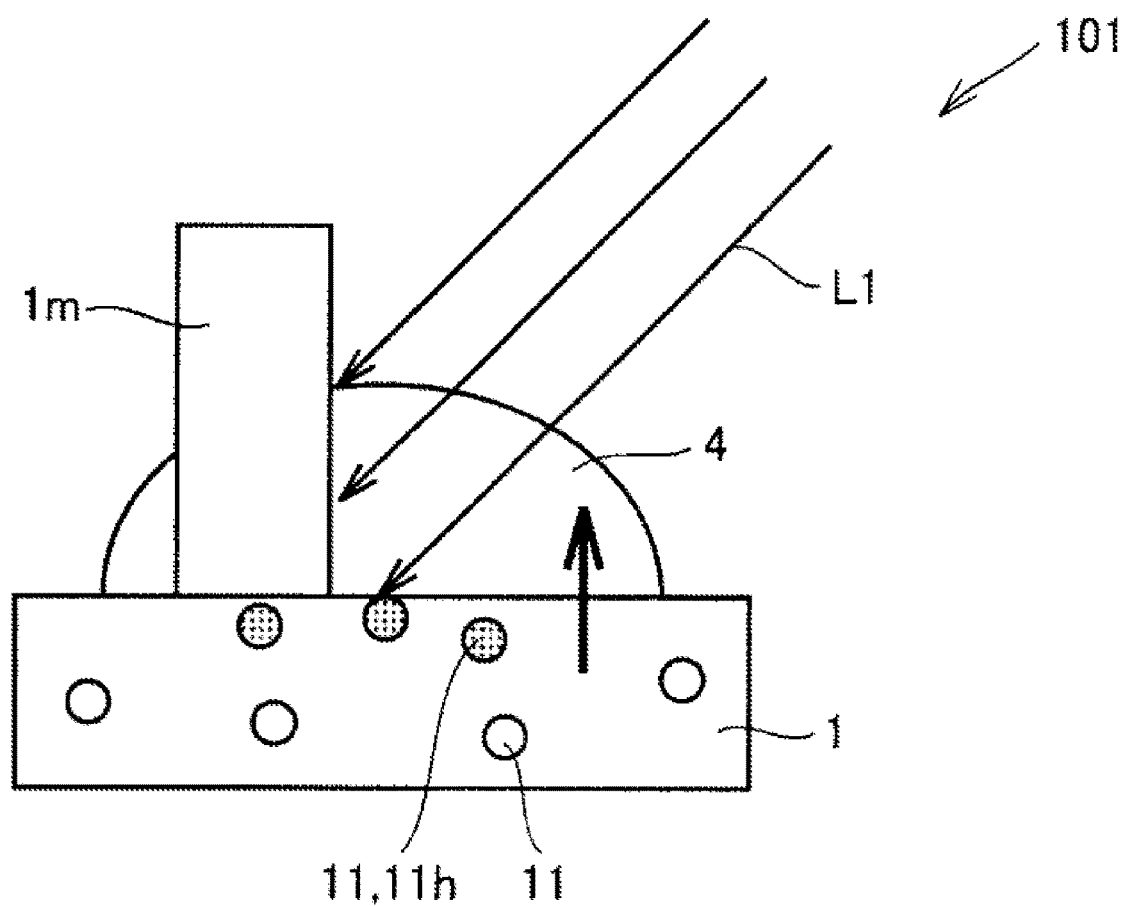
FIG. 3 is a schematic cross-sectional view showing another example of a method for curing an adhesive composition according to an aspect of the present invention.
Figure 4:
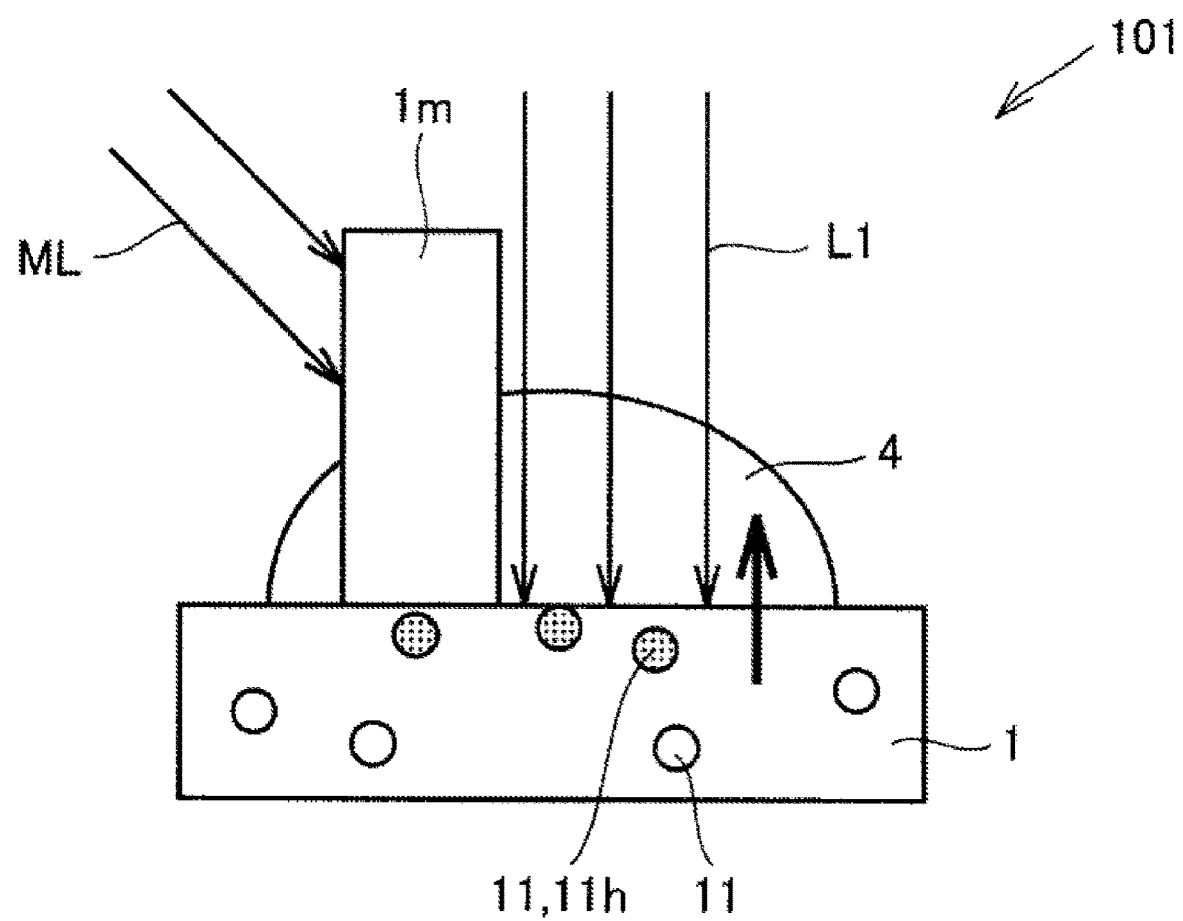
FIG. 4 is a schematic cross-sectional view showing another example of a method for curing an adhesive composition according to an aspect of the present invention.
Figure 5A:
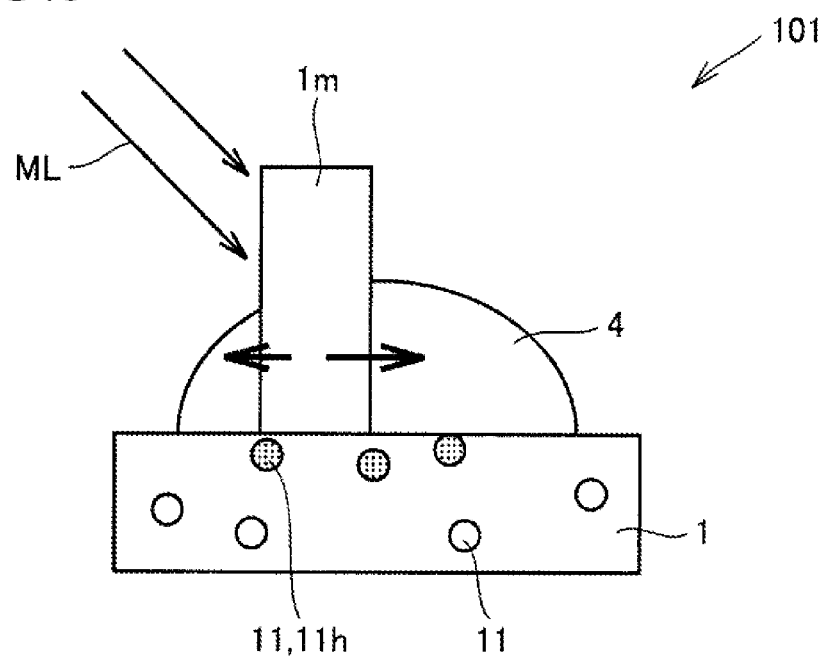
FIGS. 5A and B are schematic cross-sectional views showing another example of a method for curing an adhesive composition according to an aspect of the present invention.
Figure 5A:

As shown in FIGS. 3 to 5, in addition to the configuration of the first example, second to fourth examples of the method for curing an adhesive composition according to the present embodiment have a configuration in which the first adherend 1 includes a metal portion 1$m$, and the metal portion 1$m$ is heated in the step of curing the above-described adhesive composition 4. According to the second to fourth examples of the method for curing an adhesive composition, the metal portion 1$m$ is also heated in addition to the surface of the first adherend 1 and the vicinity of the surface, in which heat is generated by the first light-to-heat conversion material 11 (the light-to-heat conversion material 11$h$ in FIGS. 3 to 5 shows the light-to-heat conversion material 11 generating heat), and therefore curing of the adhesive composition 4 is promoted starting from the portion of the adhesive composition 4 that forms an interface with the first adherend 1 and an interface with the metal portion 1$m$. As a result, the degree of curing of the adhesive composition 4 is further increased in its portion that forms the interface with the first adherend 1, and accordingly the degree of adhesion between the adhesive composition 4 and each of the first adherend 1 and the metal portion 1$m$ is further increased. Here, the method for heating the metal portion 1$m$ is not specifically limited, and well-known methods, such as application of magnetism and irradiation with laser light, are preferably used.

In the second example of the method for curing an adhesive composition shown in FIG. 3, in the step of curing the adhesive composition 4, irradiation with the above-described laser light L1 of the first wavelength is performed to cause generation of heat by the first light-to-heat conversion material 11 at the surface of the first adherend 1 and in the vicinity of the surface (the first light-to-heat conversion material 11$h$ in FIG. 3 shows the first light-to-heat conversion material 11 generating heat) and, at the same time, heat the metal portion 1$m$.

In the third example of the method for curing an adhesive composition shown in FIG. 4, in the step of curing the adhesive composition 4, heat is generated by the first light-to-heat conversion material 11 at the surface of the first adherend 1 and in the vicinity of the surface (the first light-to-heat conversion material 11$h$ in FIG. 4 shows the first light-to-heat conversion material 11 generating heat) through irradiation with the above-described laser light L1 of the first wavelength, and at the same time, the metal portion 1$m$ is heated through application of magnetism and/or irradiation with another laser light ML, for example.

Figure 5B:
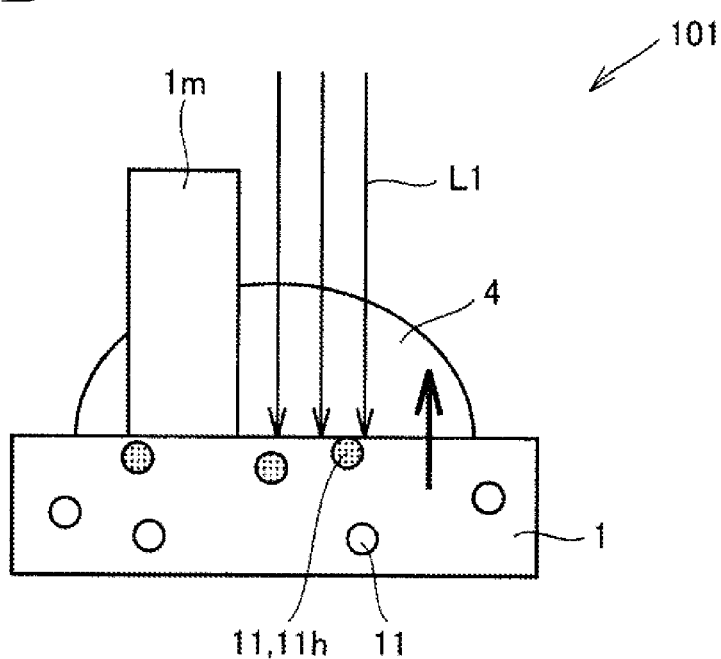

In the fourth example of the method for curing an adhesive composition shown in FIGS. 5A and 5B, in the step of curing the adhesive composition 4, first, a portion of the adhesive composition 4 that forms an interface with the metal portion 1$m$ is cured, as shown in FIG. 5A, by applying magnetism to the metal portion 1$m$ and/or irradiating the metal portion 1$m$ with another laser light ML (FIG. 5A). Then, the adhesive composition 4 is cured from its portion that forms an interface of the first adherend 1 by irradiating the surface of the first adherend 1 with the above-described laser light L1 of the first wavelength, as shown in FIG. 5B. Here, the first light-to-heat conversion material 11$h$ in FIGS. 5A and 5B shows the first light-to-heat conversion material 11 generating heat.

Fifth Example

Figure 6:
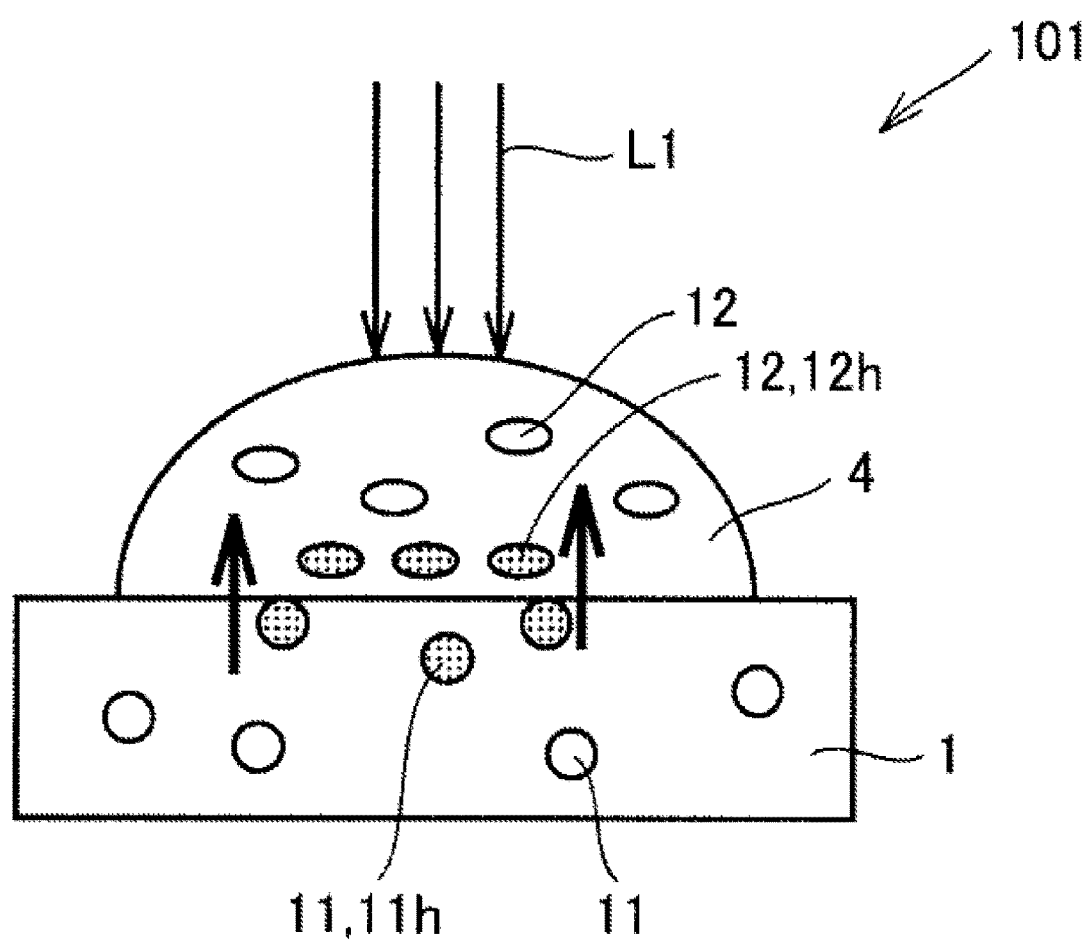
FIG. 6 is a schematic cross-sectional view showing another example of a method for curing an adhesive composition according to an aspect of the present invention.

As shown in FIG. 6, in addition to the configuration of the first example, a fifth example of the method for curing an adhesive composition according to the present embodiment has a configuration in which the adhesive composition 4 contains a second light-to-heat conversion material 12 that changes, when heated, to a material that generates heat by absorbing laser light of the first wavelength. According to the fifth example of the method for curing an adhesive composition, the second light-to-heat conversion material 12 contained in the adhesive composition 4 forms a heat generation region in order from the portion of the adhesive composition 4 that forms an interface with the first adherend 1 toward the inner side of the adhesive composition 4 (in FIG. 6, the first light-to-heat conversion material 11h shows the first light-to-heat conversion material 11 generating heat, and a second light-to-heat conversion material 12h shows the light-to-heat conversion material 12 that is heated and is generating heat by absorbing laser light of the first wavelength), and therefore curing of the adhesive composition 4 is promoted starting from its portion that forms the interface with the first adherend 1. As a result, the degree of curing of the adhesive composition 4 is further increased in its portion forming the interface with the first adherend 1, and accordingly the degree of adhesion between the adhesive composition 4 and the first adherend 1 is further increased.

Second Light-to-Heat Conversion Material

The second light-to-heat conversion material 12 is not specifically limited, as long as the second light-to-heat conversion material 12 transmits or hardly absorbs laser light of the first wavelength at room temperature (for example, 25° C.) and changes, when heated to a specific temperature or higher, to a material that generates heat by absorbing laser light L1 of the first wavelength. Thermochromic materials are preferably used, for example. Thermochromic materials are materials that change color when heated to a predetermined temperature or higher, for example, Thermal Color 01-220 manufactured by Kiroku Sozai Sogo Kenkyusho Co., Ltd. changes from white to black when heated to 220° C. or higher. The temperature at which the color changes can be adjusted.

Sixth Example

Figure 7:
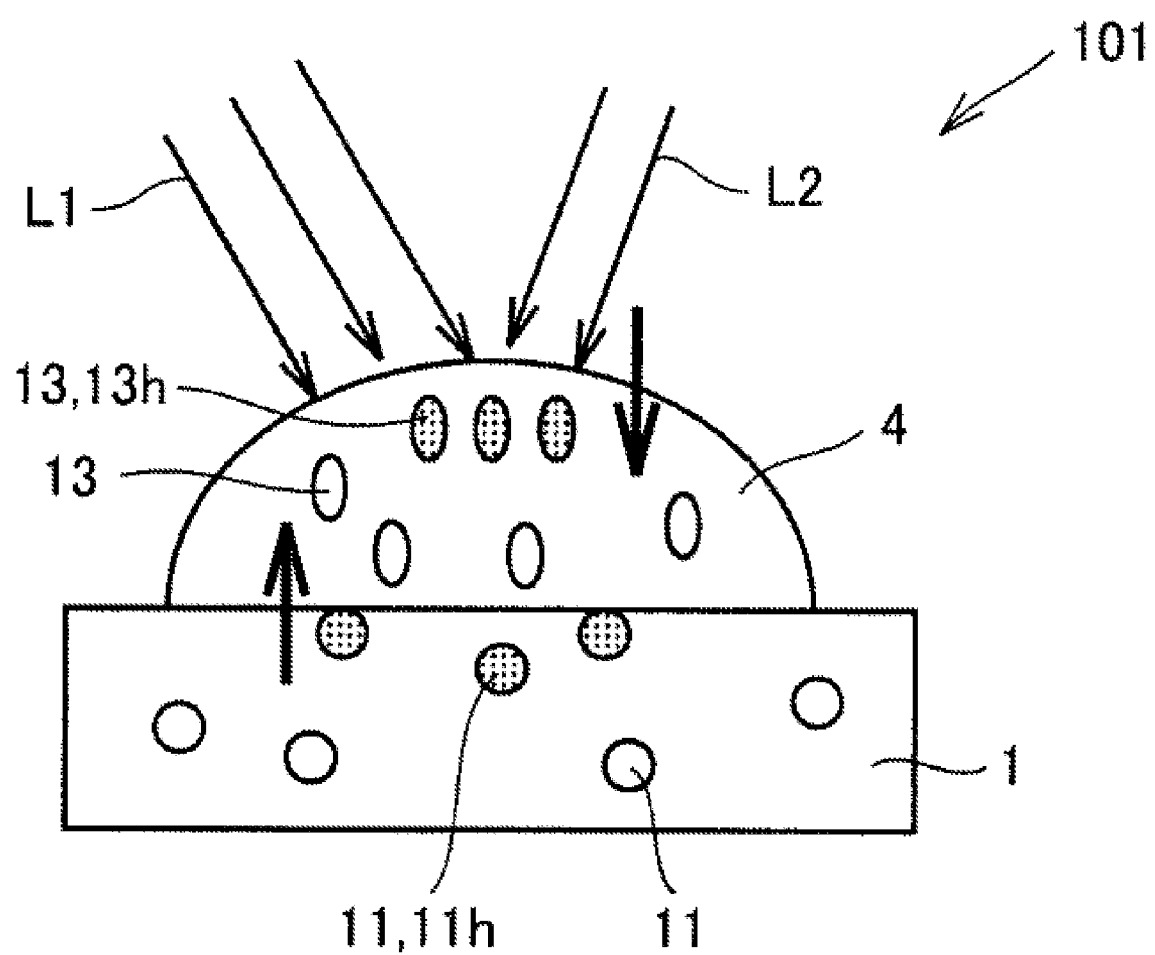
FIG. 7 is a schematic cross-sectional view showing another example of a method for curing an adhesive composition according to an aspect of the present invention.

As shown in FIG. 7, in addition to the configuration of the first example, a sixth example of the method for curing an adhesive composition according to the present embodiment has a configuration in which the adhesive composition 4 contains a third light-to-heat conversion material 13 that generates heat by absorbing laser light L2 of a second wavelength that is different from the first wavelength and, in the step of curing the adhesive composition 4, the adhesive composition 4 and the first adherend 1 are irradiated with laser light L1 of the first wavelength and laser light L2 of the second wavelength. According to the sixth example of the method for curing an adhesive composition, heat is generated by the third light-to-heat conversion material 13 at an exposed surface of the adhesive composition 4 and in the vicinity of the exposed surface through irradiation with laser light L2 of the second wavelength (a third light-to-heat conversion material 13h in FIG. 7 shows the third light-to-heat conversion material 13 generating heat), in addition to heat being generated by the first light-to-heat conversion material at the surface of the first adherend 1 and in the vicinity of the surface through irradiation with laser light L1 of the first wavelength (the light-to-heat conversion material 11h in FIG. 7 shows the light-to-heat conversion material 11 generating heat), and therefore the adhesive composition 4 is cured from both the exposed surface side and a portion of the adhesive composition 4 that forms an interface with the first adherend 1. However, in the sixth example, in order to ensure that an interface side portion of the adhesive composition 4 is cured, the intensity of laser light L1 of the first wavelength needs to be higher than that of laser light L2 of the second wavelength so that curing of the interface side portion of the adhesive composition 4 proceeds preferentially, compared to curing of an exposed surface side portion of the adhesive composition 4. In this case, the degree of curing of the adhesive composition 4 is increased in its portion that forms the interface with the first adherend 1 and in its exposed surface side portion, and accordingly the degree of adhesion between the adhesive composition 4 and the first adherend 1 is further increased.

Third Light-to-Heat Conversion Material

The third light-to-heat conversion material 13 is not specifically limited, as long as the third light-to-heat conversion material 13 transmits laser light L1 of the first wavelength and generates heat by absorbing laser light L2 of the second wavelength, and infrared absorbing materials are preferably used, for example. An example of infrared ray absorbing materials is FDN-002 manufactured by YAMADA CHEMICAL CO., LTD., which transmits laser light of a wavelength of 1064 nm and absorbs laser light of a wavelength of 808 nm.

Seventh Example

Figure 8:
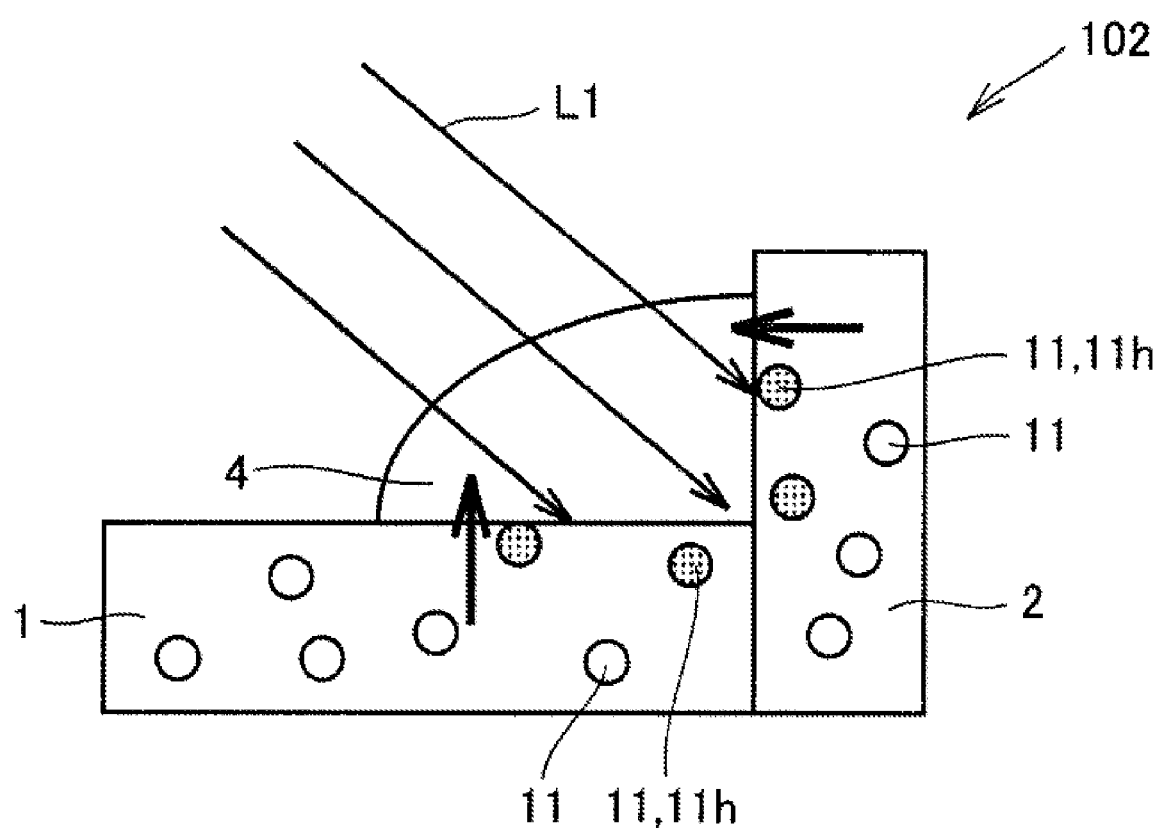
FIG. 8 is a schematic cross-sectional view showing another example of a method for curing an adhesive composition according to an aspect of the present invention.

As shown in FIG. 8, in addition to the configuration of the first example, a seventh example of the method for curing an adhesive composition according to the present embodiment has a configuration in which, in the step of arranging the adhesive composition 4, the adhesive composition 4 is arranged in contact with both the surface of the first adherend 1 and a surface of a second adherend 2 that contains the first light-to-heat conversion material 11 at least at its surface, and in the step of curing the adhesive composition 4, the adhesive composition 4 is cured by irradiating the adhesive composition 4, the first adherend 1, and the second adherend 2 with laser light L1 of the first wavelength. According to the seventh example of the method for curing an adhesive composition, heat is generated by the first light-to-heat conversion material at the surface of the second adherend 2 and in the vicinity of the surface through irradiation with laser light L1 of the first wavelength (the first light-to-heat conversion material 11h contained in the second adherend 2 in FIG. 8 shows the first light-to-heat conversion material 11 generating heat), in addition to heat being generated by the first light-to-heat conversion material at the surface of the first adherend 1 and in the vicinity of the surface through irradiation with laser light L1 of the first wavelength (the light-to-heat conversion material 11h contained in the first adherend 1 in FIG. 8 shows the light-to-heat conversion material 11 generating heat), and therefore the adhesive composition 4 is cured from both its portion that forms an interface with the first adherend 1 and its portion that forms an interface with the second adherend 2. As a result, the first adherend and the second adherend can be bonded to each other via the adhesive composition, and the degree of curing of the adhesive composition 4 is increased in its portion forming the interface with the first adherend 1 and its portion forming the interface with the second adherend 2, and accordingly the degree of adhesion between the adhesive composition 4 and each of the first adherend 1 and the second adherend 2 is increased.

Second Adherend

The second adherend 2 is not specifically limited, as long as the second adherend 2 contains the above-described first light-to-heat conversion material 11 at least in its surface, and the second adherend 2 may contain a resin such as PBT (polybutylene terephthalate) or PET (polyethylene terephthalate). Here, the chemical composition of the second adherend 2 may be the same as or different from that of the first adherend 1.

Eighth Example

Figure 9:
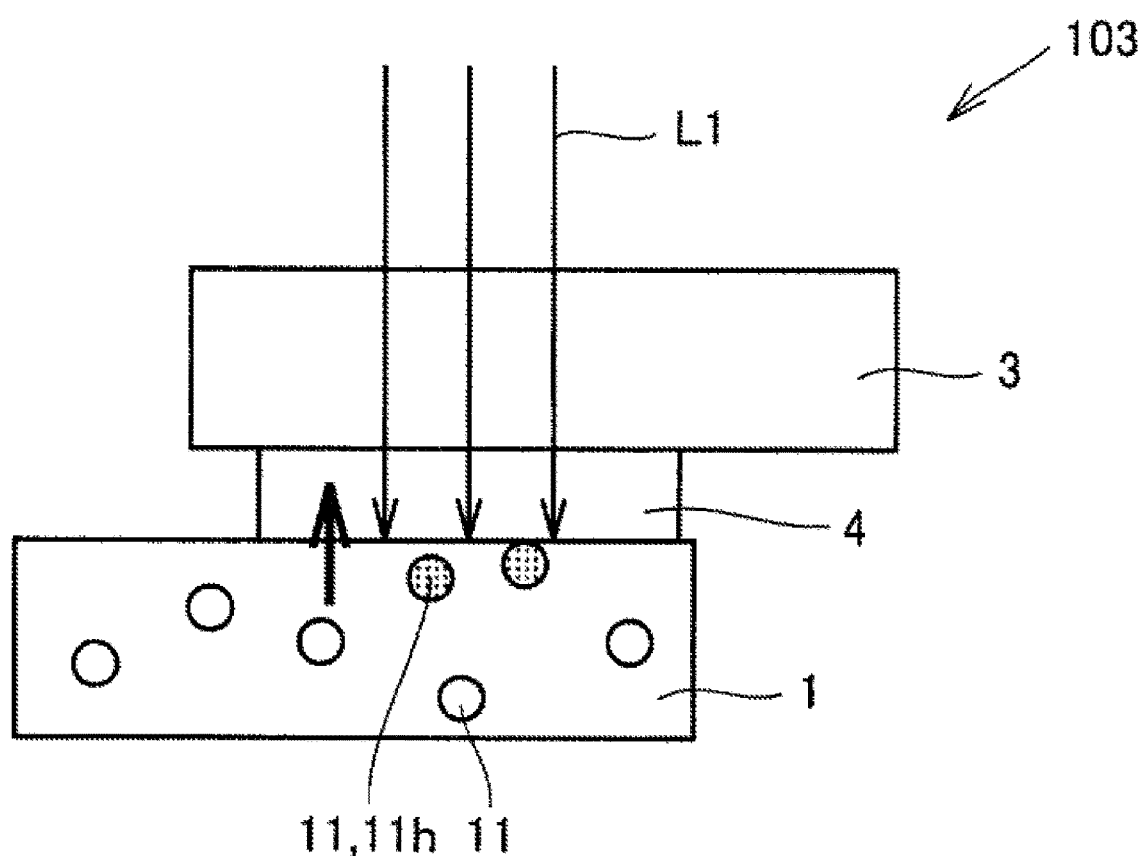
FIG. 9 is a schematic cross-sectional view showing another example of a method for curing an adhesive composition according to an aspect of the present invention.

As shown in FIG. 9, in addition to the configuration of the first example, an eighth example of the method for curing an adhesive composition according to the present embodiment has a configuration in which, in the step of arranging the adhesive composition 4, the adhesive composition 4 is arranged in contact with both the surface of the first adherend 1 and a surface of a third adherend 3 that transmits laser light L1 of the first wavelength, and in the step of curing the adhesive composition 4, the adhesive composition 4 is cured by irradiating the third adherend 3, the adhesive composition 4, and the first adherend 1 with laser light L1 of the first wavelength. According to the eighth example of the method for curing an adhesive composition, heat is generated by the first light-to-heat conversion material at the surface of the first adherend 1 and in the vicinity of the surface through irradiation with laser light L1 of the first wavelength (the first light-to-heat conversion material 11h in FIG. 9 shows the first light-to-heat conversion material 11 generating heat), and therefore the adhesive composition 4 is cured from its portion that forms an interface with the first adherend 1. As a result, the first adherend and the third adherend can be bonded to each other via the adhesive composition, and the degree of curing of the adhesive composition 4 is increased in its portion forming the interface with the first adherend 1, and accordingly the degree of adhesion between the adhesive composition 4 and the first adherend 1 is increased.

Third Adherend

Although the third adherend 3 is not specifically limited as long as the third adherend 3 transmits laser light L1 of the first wavelength, the transmittance of the third adherend 3 with a thickness of 0.5 mm is preferably at least 30%, more preferably at least 50%, and further preferably at least 80%, from the standpoint of suppressing absorption of laser light L1 of the first wavelength by the third adherend 3 and increasing the amount of laser light L1 of the first wavelength that is transmitted to the surface of the first adherend 1. Here, the transmittance is determined by measuring the amount of light that enters an optical receiver of a power meter when the third adherend with a thickness of 0.5 mm that is sandwiched between glass plates is irradiated with laser light, and is expressed as a percentage, taking the amount of light that enters the optical receiver of the power meter in the absence of the glass plates and the third adherend as 100%. Examples of the third adherend 3 include colorless resins such as PBT (polybutylene terephthalate), PA (polyamide), and PET (polyethylene terephthalate).

Embodiment 2: Method for Manufacturing Bonded Structure

First Example

As shown in FIGS. 1 and 3 to 7, in a first example of a method for manufacturing a bonded structure according to the present embodiment, a first bonded structure 101 is manufactured by bonding the adhesive composition 4 to the first adherend 1 by using any of the first to sixth examples of the method for curing an adhesive composition according to Embodiment 1. According to the first example of the method for manufacturing a bonded structure, the curing ratio is increased in a portion of the adhesive composition 4 that forms an interface with the first adherend 1, and therefore the first bonded structure 101 in which a high degree of adhesion is realized between the first adherend 1 and the adhesive composition 4 can be obtained.

Second Example

As shown in FIG. 8, in a second example of the method for manufacturing a bonded structure according to the present embodiment, a second bonded structure 102 is manufactured by bonding the first adherend 1 and the second adherend 2 to each other via the adhesive composition 4 by using the seventh example of the method for curing an adhesive composition according to Embodiment 1. According to the second example of the method for manufacturing a bonded structure, the curing ratio is increased in a portion of the adhesive composition 4 that forms an interface with the first adherend 1 and an interface with the second adherend 2, and therefore the second bonded structure 102 in which a high degree of adhesion is realized between the adhesive composition 4 and each of the first adherend 1 and the second adherend 2 can be obtained.

Third Example

As shown in FIG. 9, in a third example of the method for manufacturing a bonded structure according to the present embodiment, a third bonded structure 103 is manufactured by bonding the first adherend 1 and the third adherend 3 to each other via the adhesive composition 4 by using the eighth example of the method for curing an adhesive composition according to Embodiment 1. According to the third example of the method for manufacturing a bonded structure, the curing ratio is increased in a portion of the adhesive composition 4 that forms an interface with the first adherend 1, and therefore the third bonded structure 103 in which a high degree of adhesion is realized between the first adherend 1 and the adhesive composition 4 can be obtained.

Figure 10A:
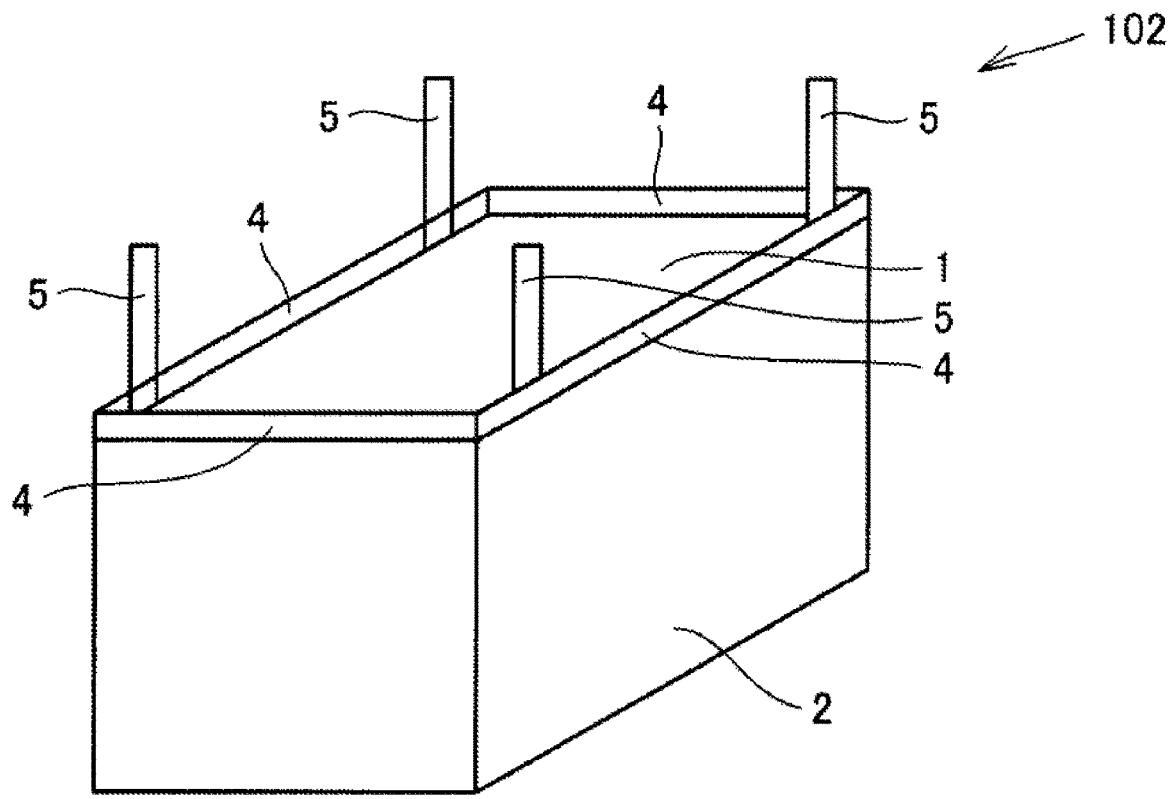
FIG. 10A is a schematic diagram showing an example of a bonded structure according to another aspect of the present invention.
Figure 10B:
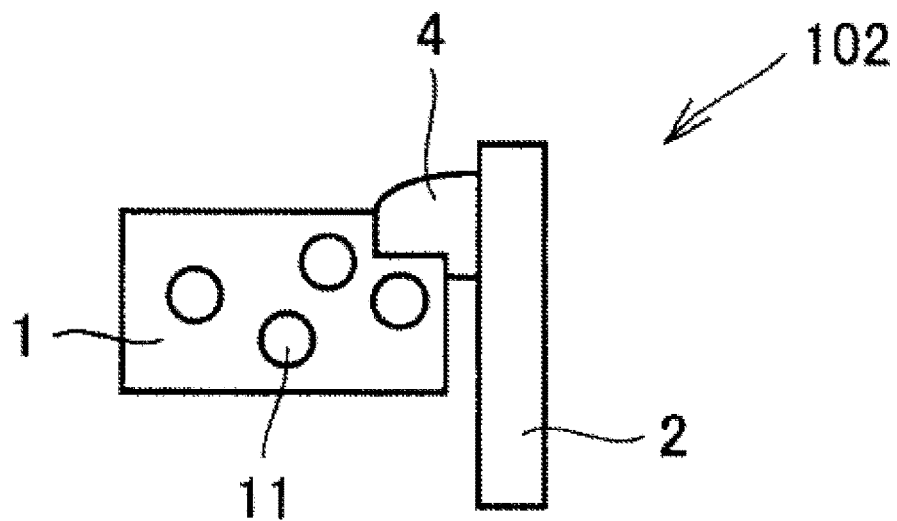
FIG. 10B is a partial enlarged view showing a portion of the bonded structure shown in FIG. 10A.
Figure 10C:
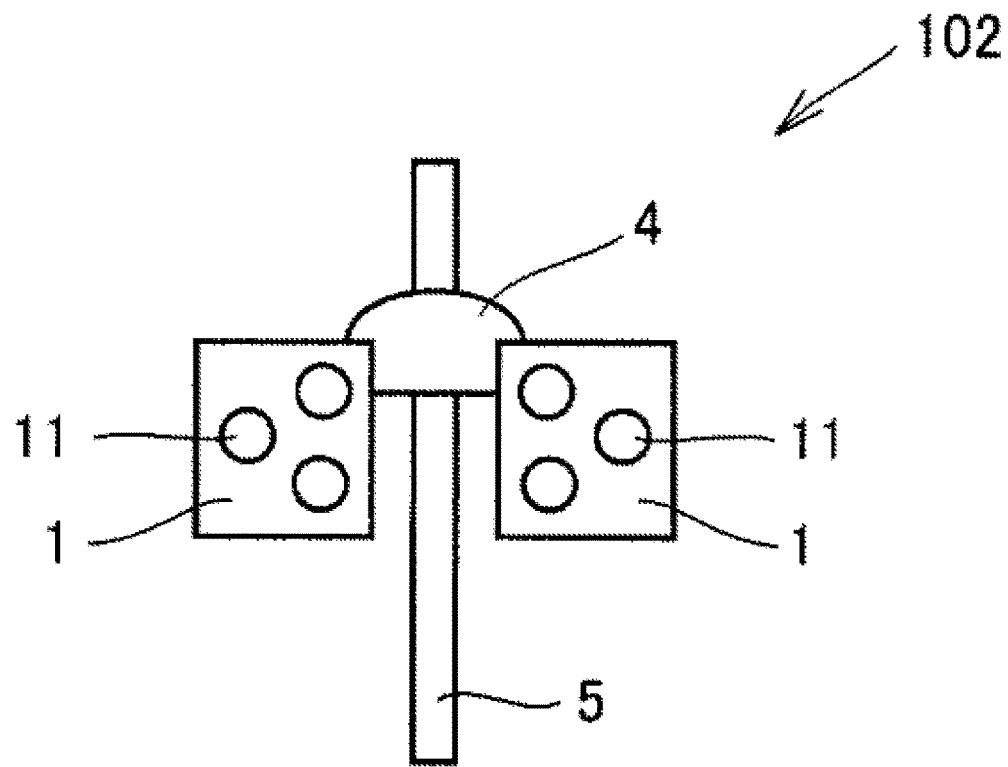
FIG. 10C is a partial enlarged view showing another portion of the bonded structure shown in FIG. 10A.

An example of the second bonded structure 102 obtained by using the method for manufacturing a bonded structure according to the present embodiment is a relay component in which a base (the first adherend 1) and a case (the second adherend 2) are bonded to each other via the adhesive composition 4, as shown in FIGS. 10A to 10C. Here, FIG. 10A is a schematic perspective view of the second bonded structure 102, FIG. 10B is a partial enlarged cross-sectional view of the first adherend 1 and the second adherend 2 that are bonded to each other via the adhesive composition 4, and FIG. 10C is a partial enlarged view of the first adherend 1 and a terminal electrode 5 that are bonded to each other via the adhesive composition 4.

EXAMPLES

Example 1

Figure 11:
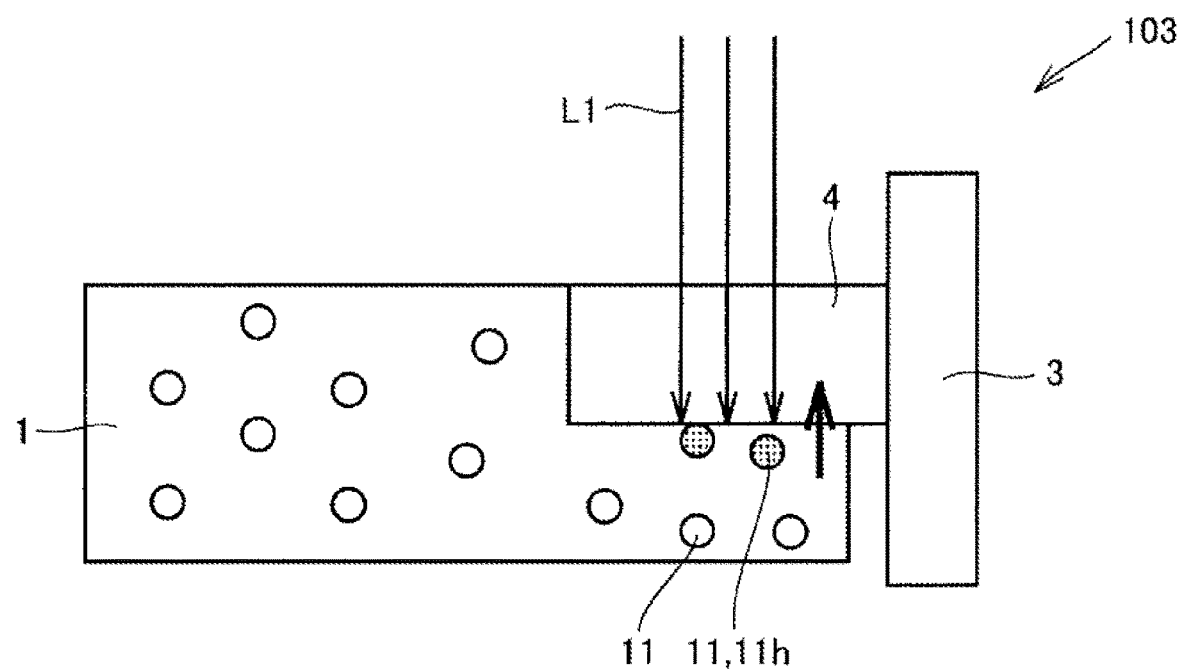
FIG. 11 is a schematic cross-sectional view showing another example of a method for curing an adhesive composition according to an aspect of the present invention.

As shown in FIG. 11, a groove with a depth of 0.5 mm was formed in an end portion of a PBT (polybutylene terephthalate) plate (a first adherend 1) with a thickness of 1 mm that contained 0.5% by mass of carbon black (a first light-to-heat conversion material 11). Then, an adhesive composition 4 that contained 100 parts by mass of a bisphenol A epoxy resin (jER828 manufactured by Mitsubishi Chemical Corporation), 5 parts by mass of an epoxy resin imidazole adduct compound (AMICURE (registered trademark) PN-23 manufactured by Ajinomoto Fine-Techno Co., Inc.), 20 parts by mass of a capsule curing agent (NOVACURE (registered trademark) HX-3722 manufactured by Asahi Kasei E-materials Corp.), and 20 parts by mass of silica was arranged on the above-described groove, and a PBT (polybutylene terephthalate) plate with a thickness of 0.5 mm that transmits laser light of a wavelength of 808 nm was arranged such that a main surface of this PBT plate was in contact with a side surface of the adhesive composition 4. The above-described adhesive composition 4 and first adherend 1 were irradiated with laser light (laser light source: JOLD-32-CPBN-1L manufactured by JENOPTIK Japan Co., Ltd.) of a wavelength of 808 nm (the first wavelength) from a direction perpendicular to main surfaces of the first adherend 1. Irradiation with laser light was performed with a laser output of 2 W for 1 second to increase the temperature at the interface between the adhesive composition and the first adherend to 130° C., and then the temperature was kept at 130° C. for 30 seconds by performing irradiation with a laser output of 0.8 W. The curing ratio of the cured adhesive composition 4 at a depth of 0.5 mm (i.e., the interface between the resin composition and the first adherend) was 92%, which is extremely high, and a third bonded structure 103 in which a high degree of adhesion was realized and the first adherend 1 and the adhesive composition 4 were stable was obtained. Here, the curing ratio was determined by comparing absorbance peak areas of specific functional groups contained in the adhesive composition before and after curing. It should be noted that the curing ratio is expressed by the following formula using peak areas of the specific functional groups.

Curing ratio (%)=(absorbance peak area of glycidyl group after curing/absorbance peak area of methylene group after curing)/(absorbance peak area of glycidyl group before curing/absorbance peak area of methylene group before curing)

Absorbance peak areas were measured by using FT-IR (system2000 manufactured by PerkinElmer, Inc.) equipped with golden diamond ATR. An absorbance peak area of the glycidyl group around an absorption position of 910 cm$^{-1}$ and an absorbance peak area of the methylene group around an absorption position of 2900 cm$^{-1}$ were taken as respective absorbance areas of the glycidyl group and the methylene group. In general, if the curing ratio is 80%, it is considered that reactants are sufficiently reacted.

Comparative Example 1

An adhesive composition was cured in the same manner as in Example 1, except that a transparent PBT (polybutylene terephthalate) plate with a thickness of 1 mm that did not contain carbon black was used as the first adherend, the adhesive composition that was used contained 100 parts by mass of a bisphenol A epoxy resin (jER828 manufactured by Mitsubishi Chemical Corporation), 5 parts by mass of an epoxy resin imidazole adduct compound (AMICURE (registered trademark) PN-23 manufactured by Ajinomoto Fine-Techno Co., Inc.), 20 parts by mass of a capsule curing agent (NOVACURE (registered trademark) HX-3722 manufactured by Asahi Kasei E-materials Corp.), 20 parts by mass of silica, and 1 part by mass of carbon black, and the inside temperature of the adhesive composition was increased to 130° C. The curing ratio of the cured adhesive composition 4 at a depth of 0.5 mm (i.e., the interface between the resin composition and the first adherend) was 27%, which is extremely low, and, in a bonded structure 100 that was obtained by bonding the adhesive composition 4 to the first adherend 1, the degree of adhesion was unstable and was low (FIG. 2).

Example 2

As shown in FIG. 3, a metal component (width: 0.8 mm×thickness: 0.2 mm×height: 4.7 mm) made of pure copper was arranged, as a metal portion 1m, on a PBT (polybutylene terephthalate) plate (a first adherend 1) with a thickness of 1 mm that contained 0.5% by mass of carbon black (a first light-to-heat conversion material 11). An adhesive composition 4 that contained 100 parts by mass of a bisphenol A epoxy resin (jER828 manufactured by Mitsubishi Chemical Corporation), 5 parts by mass of an epoxy resin imidazole adduct compound (AMICURE (registered trademark) PN-23 manufactured by Ajinomoto Fine-Techno Co., Inc.), 20 parts by mass of a capsule curing agent (NOVACURE (registered trademark) HX-3722 manufactured by Asahi Kasei E-materials Corp.), and 20 parts by mass of silica was arranged on the first adherend 1. The above-described adhesive composition 4, first adherend 1, and its metal portion 1m were irradiated with laser light of a wavelength of 365 nm (a third wavelength) from an oblique direction that formed an angle of 45° with respect to the first adherend 1 and the metal portion 1m. Irradiation with laser light was performed with a laser output of 12 W for 40 seconds to increase the temperature at the interface between the adhesive composition and the metal portion 1m of the first adherend 1 to 130° C., and then the temperature was kept at 130° C. for 30 seconds by performing irradiation with a laser output of 10 W. The curing ratio of the cured adhesive composition 4 at a depth of 0.5 mm (i.e., an interface with the first adherend and its metal portion) was 90%, which is extremely high, and a first bonded structure 101 in which a high degree of adhesion was realized and the adhesive composition 4 and the first adherend 1 including the metal portion 1m were stable was obtained.

Example 3

As shown in FIG. 8, an adhesive composition 4 that contained 100 parts by mass of a bisphenol A epoxy resin (jER828 manufactured by Mitsubishi Chemical Corporation), 5 parts by mass of an epoxy resin imidazole adduct compound (AMICURE (registered trademark) PN-23 manufactured by Ajinomoto Fine-Techno Co., Inc.), 20 parts by mass of a capsule curing agent (NOVACURE (registered trademark) HX-3722 manufactured by Asahi Kasei E-materials Corp.), and 20 parts by mass of silica was arranged on a PBT (polybutylene terephthalate) plate (a first adherend 1)

with a thickness of 1 mm that contained 0.5% by mass of carbon black (a first light-to-heat conversion material 11), and a PBT (polybutylene terephthalate) plate (a second adherend 2) with a thickness of 0.5 mm that contained 0.5% by mass of carbon black (the first light-to-heat conversion material 11) was arranged such that a main surface of this PBT plate was in contact with a side surface of the adhesive composition 4. The above-described adhesive composition 4, first adherend 1, and second adherend 2 were irradiated with laser light of a wavelength of 808 nm (the first wavelength) from an oblique direction that formed an angle of 45° with respect to the first adherend 1. Irradiation with laser light was performed with a laser output of 2 W for 1 second to increase the temperature at the interface between the adhesive composition and each of the first adherend 1 and the second adherend 2 to 130° C., and then the temperature was kept at 130° C. for 30 seconds by performing irradiation with a laser output of 0.8 W. The curing ratio of the cured adhesive composition 4 at a depth of 0.5 mm (i.e., the interface between the resin composition and the first adherend and the interface between the resin composition and the second adherend) was 95%, which is extremely high, and a second bonded structure 102 in which a high degree of adhesion was realized and the adhesive composition 4 and each of the first adherend 1 and the second adherend 2 were stable was obtained.

Example 4

As shown in FIG. 9, an adhesive composition 4 that contained 100 parts by mass of a bisphenol A epoxy resin (jER828 manufactured by Mitsubishi Chemical Corporation), 5 parts by mass of an epoxy resin imidazole adduct compound (AMICURE (registered trademark) PN-23 manufactured by Ajinomoto Fine-Techno Co., Inc.), 20 parts by mass of a capsule curing agent (NOVACURE (registered trademark) HX-3722 manufactured by Asahi Kasei E-materials Corp.), and 20 parts by mass of silica was arranged on a PBT (polybutylene terephthalate) plate (a first adherend 1) with a thickness of 1 mm that contained 0.8% by mass of carbon black (a first light-to-heat conversion material 11), and a PBT (polybutylene terephthalate) plate (a third adherend 3) with a thickness of 0.5 mm that was a raw material and did not contain carbon black (the first light-to-heat conversion material 11) was arranged such that a main surface of this PBT plate was in contact with an upper surface of the adhesive composition 4. The above-described third adherend 3, adhesive composition 4, and first adherend 1 were irradiated with laser light of a wavelength of 808 nm (the first wavelength) from a direction perpendicular to main surfaces of the first adherend 1. Irradiation with laser light was performed with a laser output of 8 W for 1 second to increase the temperature at the interface between the adhesive composition and the first adherend to 130° C., and then the temperature was kept at 130° C. for 30 seconds by performing irradiation with a laser output of 2 W. The curing ratio of the cured adhesive composition 4 at a depth of 0.5 mm (i.e., the interface between the resin composition and the first adherend) was 91%, which is extremely high, and a third bonded structure 103 in which a high degree of adhesion was realized and the first adherend 1 and the adhesive composition 4 were stable was obtained.

The embodiments and examples disclosed herein are considered in all respects to be illustrative and not restrictive. The scope of the present invention is indicated by the claims rather than by the above-described embodiments and examples, and all changes that come within the meaning and range of equivalency of the claims are intended to be encompassed therein.

INDEX TO THE REFERENCE NUMERALS

1 . . . first adherend, 1m . . . metal portion, 2 . . . second adherend, 3 . . . third adherend, 4, 4R . . . adhesive composition, 4c . . . cured film, 11, 11h . . . first light-to-heat conversion material, 12, 12h . . . second light-to-heat conversion material, 13, 13h . . . third light-to-heat conversion material, 100 . . . bonded structure, 101 . . . first bonded structure, 102 . . . second bonded structure, 103 . . . third bonded structure, L1 . . . laser light of first wavelength, L2 . . . laser light of second wavelength, ML . . . magnetism and/or another laser light

The invention claimed is:

1. A method for curing an adhesive composition, comprising:
    arranging an adhesive composition that transmits laser light of a first wavelength in contact with a surface of a first adherend that contains, at least at its surface, a first material that generates heat by absorbing laser light of the first wavelength; and
    curing the adhesive composition by irradiating the adhesive composition and the first adherend with laser light of the first wavelength, wherein
    the adhesive composition contains a second material that changes, when heated, to a material that generates heat by absorbing laser light of the first wavelength.

2. The method for curing an adhesive composition according to claim 1, wherein
    the first adherend comprises a metal portion, and in the curing of the adhesive composition, the metal portion is heated.

3. The method for curing an adhesive composition according to claim 1, wherein,
    in the arranging of the adhesive composition, the adhesive composition is arranged in contact with both the surface of the first adherend and a surface of a second adherend that contains the first material at least at its surface, and
    in the curing of the adhesive composition, the adhesive composition is cured by irradiating the adhesive composition, the first adherend, and the second adherend with laser light of the first wavelength.

4. The method for curing an adhesive composition according to claim 1, wherein,
    in the arranging of the adhesive composition, the adhesive composition is arranged in contact with both the surface of the first adherend and a surface of a third adherend that transmits laser light of the first wavelength, and
    in the curing of the adhesive composition, the adhesive composition is cured by irradiating the a third adherend, the adhesive composition, and the first adherend with laser light of the first wavelength.

5. The method for curing an adhesive composition according to claim 2, wherein,
    in the arranging of the adhesive composition, the adhesive composition is arranged in contact with both the surface of the first adherend and a surface of a second adherend that contains the first material at least at its surface, and
    in the curing of the adhesive composition, the adhesive composition is cured by irradiating the adhesive composition, the first adherend, and the second adherend with laser light of the first wavelength.

6. The method for curing an adhesive composition according to claim 2, wherein, in the arranging of the adhesive composition, the adhesive composition is arranged in contact with both the surface of the first adherend and a surface of a third adherend that transmits laser light of the first wavelength, and in the curing of the adhesive composition, the adhesive composition is cured by irradiating the third adherend, the adhesive composition, and the first adherend with laser light of the first wavelength.

7. A method for manufacturing a bonded structure in which a first bonded structure is manufactured by bonding the adhesive composition to the first adherend by using the method for curing an adhesive composition according to claim 2.

* * * * *